Figure 1:
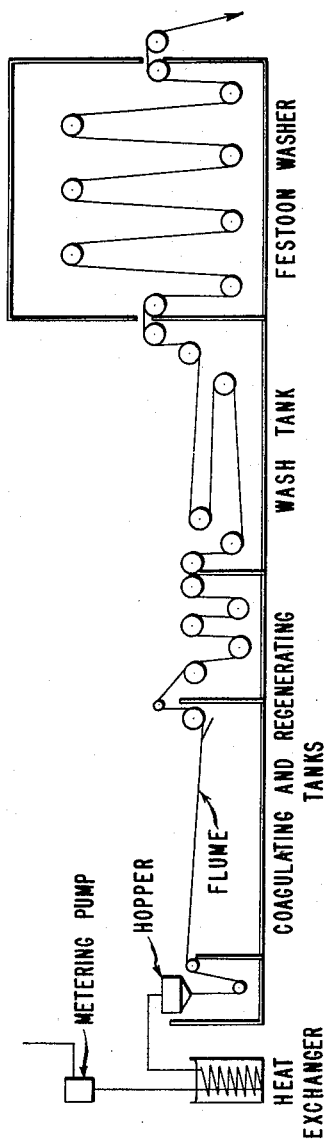

July 12, 1960  
J. A. MITCHELL ET AL  
PROCESS FOR THE PRODUCTION OF IMPROVED  
REGENERATED CELLULOSE FILMS  
Filed Feb. 2, 1956

2,944,296

2 Sheets-Sheet 1

INVENTORS  
J. A. MITCHELL  
B. L. HINKLE  
BY Herbert M. Wolfson  
ATTORNEY

2,944,296
PROCESS FOR THE PRODUCTION OF IMPROVED REGENERATED CELLULOSE FILMS

James Albert Mitchell and Barton Leslie Hinkle, Richmond, Va., assignors to E. I. du Pont de Nemours and Company, Wilmington, Del., a corporation of Delaware Filed Feb. 2, 1956, Ser. No. 563,013

4 Claims. (Cl. 18—57)

This invention relates to the casting of regenerated cellulose film and has as its main object a process for improving impact strength and tear strength of regenerated cellulose film and limiting gauge variations across the width of the film. Other objects will appear hereinafter.

The invention comprises casting a viscose solution at a temperature of 38° C. to 50° C. into a coagulating and regenerating bath maintained at a temperature of 40° C. to 55° C., the viscose solution containing 8% to 20% cellulose, 4% to 15% alkali, and prepared by xanthating alkali cellulose with 25 parts to 50 parts carbon disulfide, by weight, to 100 parts of cellulose, preferably, the temperature of the coagulating and regenerating bath being maintained within 5° C. of the temperature of the viscose solution; stretching the partially regenerated film less than 25% prior to completing regeneration; washing the film after completing regeneration; and drying the film.

Percent stretch, as used in this specification, is defined as the difference between the linear velocity of the completely regenerated film and the linear velocity of the film when just coagulated divided by the linear velocity of the completely regenerated film, multiplied by 100. In practice, the film is too weak when first coagulated for the linear velocity to be measured. Therefore, the linear velocity of the film, after the film has coagulated sufficiently, is measured at various distances from the point of extrusion; a curve is plotted and the curve extrapolated to a point two inches below the point of extrusion.

In a specific embodiment of the invention a viscose solution was prepared in the following manner. Alkali cellulose was first prepared by soaking sheets of wood pulp and cotton linters pulp in a sodium hydroxide solution. Excess alkali was drained and then pressed from the saturated sheets. The resulting alkali cellulose was shredded and aged to provide the desired viscosity in the ultimately prepared viscose solution. The shredded alkali cellulose was then dropped into a rotatable drum, the xanthating churn, to which carbon disulfide was added for xanthation. Carbon disulfide was added to the alkali cellulose in an amount equal to 26 parts per 100 parts of the dry cellulose. The xanthated alkali cellulose was then emptied into a tank containing a dilute aqueous sodium hydroxide solution. The amount of dilute alkali was sufficient to provide a viscose solution containing 9% cellulose and 5.4% alkali calculated as sodium hydroxide. After being filtered, deaerated, and ripened to a salt index of about 3, the viscose solution at a viscosity of about 50 poises and a temperature of about 20° C. was pumped by a metering pump through a heat-exchanger to a 14 inch hopper.

Figure 1 shows in schematic form a flow sheet of the process. The heat-exchanger contained water heated to a temperature of 63° C. which served to heat the viscose solution to 45° C. at which temperature it had a viscosity of about 22 poises. The viscose solution was then cast through the lips of the hopper into a coagulating and regenerating bath containing 12% sulfuric acid and 18% sodium sulfate and maintained at a temperature between 45° C. and 50° C. After passing down a 12 foot, variable angle flume, the film was led into a second acid tank, then through a wash tank containing water at 80° C., and finally to a festoon washer containing water at 98° C. to 100° C. The regenerated cellulose film was thereafter softened by soaking in a 4% to 5% glycerol solution and subsequently dried. Tension on the film was controlled so that stretching prior to completing regeneration did not exceed 25%.

As a control, the viscose solution was aged to a viscosity of 50 poises at 20° C. and pumped directly to the hopper by-passing the heat-exchanger. In all other details the process was identical to that described previously. As an additional control, the viscose solution was cast at 45° C. and stretched more than 25% prior to completing regeneration.

The properties of the regenerated cellulose film produced from the viscose solution cast according to the present invention at 45° C. and the viscose solution cast at 20° C. are given below:

TABLE 1

| Viscose Temperature (° C.) | Tear Strength (grams) | Impact Strength (kg.-Cm.) | Tenacity (Kg.) | Elongation (Percent) |
|---|---|---|---|---|
| 20 | 3.6 | 3.4 | 18.5 | 22 |
| 45 | 5.3 | 4.8 | 21.6 | 22 |

Tenacity and elongation were measured in the conventional manner. Tear strength was determined on an Elmendorf tear tester, which measures the force (grams) required to tear a two inch strip of film. Impact strength was measured on a pendulum impact tester, which measures the energy (kilogram-centimeters) transmitted as the pendulum bob breaks the film.

The above table illustrates the decidedly superior physical properties obtained upon casting at 45° C. compared to the conventional 20° C. However, temperature is not the only important factor in producing acceptable film. The control which was stretched more than 25% prior to completing regeneration, displayed streaks at an intolerable level. This control film also displayed a wide variation in gauge across its width and its physical properties were not uniform. The properties in the transverse direction were vastly different from those in the longitudinal direction.

The invention is illustrated in greater detail by the following examples:

Example 1

This example illustrates the importance of maintaining the temperature of the viscose solution between 38° C. and 50° C. for casting into regenerated cellulose film.

A viscose solution containing 9% cellulose, 5.4% total alkali (calculated as sodium hydroxide) prepared by xanthating alkali cellulose with 25 parts of carbon disulfide to 100 parts of cellulose, was cast through a 14 inch hopper into a coagulating and regenerating bath. The bath contained 12% sulfuric acid and 18% sodium sulfate and was maintained at a temperature of about 45° C. Prior to extrusion the viscose solution was heated to various temperatures by means of the heat-exchanger previously described. After regeneration the film was purified, softened, and dried in the conventional manner.

The following table summarizes the important properties of the resulting regenerated cellulose films.

TABLE 2

| Viscose Temperature (° C.) | Tear Strength (grams) | Impact Strength (kg.-Cm.) | Tenacity (Kg.) | Elongation (Percent) |
| --- | --- | --- | --- | --- |
| 20 | 3.6 | 3.4 | 18.5 | 22 |
| 25 | 3.9 | 3.9 | 19.6 | 22 |
| 30 | 4.3 | 4.3 | 20.7 | 22 |
| 35 | 4.8 | 4.7 | 21.4 | 22 |
| 40 | 5.2 | 4.8 | 21.6 | 22 |
| 45 | 5.3 | 4.8 | 21.6 | 22 |
| 50 | 5.2 | 4.7 | 21.0 | 22 |
| 55 | 4.6 | 4.4 | 20.1 | 22 |
| 60 | 4.2 | 3.8 |  | 22 |

Figure 2:
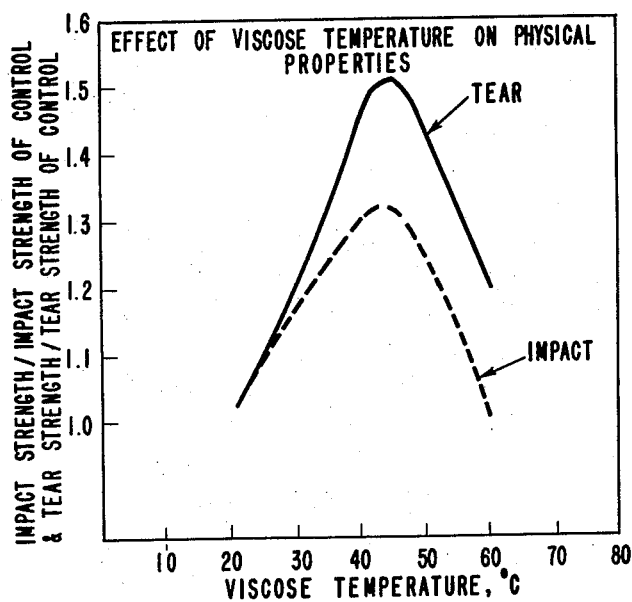

Figure 2 is a vivid picture of the above results showing the criticality of the casting temperature in improving tear and impact strengths. The temperature is plotted versus the ratios of tear strength/tear strength of a control (solid line) and impact strength/impact strength of a control (dashed line). The control film was cast from the identical viscose solution by the conventional process at 20° C. The result shows that a 20% to 30% improvement in impact strength and a 25% to 50% improvement in tear strength may be achieved by casting viscose between 38° C. and 50° C., this maximum improvement being obtained at about 45° C.

It was also apparent that poor gauge control was obtained when the viscose temperature was varied to more than 5° C. higher than the temperature of the coagulating and regenerating bath. The wide sheet was not uniformly flat unless this precaution was observed.

*Example II*

This example shows that the invention is independent of the coagulating and regenerating system used. In this example a viscose solution containing 8.6% cellulose and 5% total alkali was prepared in the manner previously described using 40 parts of carbon disulfide per 100 parts of cellulose. The viscose solution was cast at temperatures ranging from 25° C. to 50° C. Where heating was necessary, the heat-exchanger previously described was used. The film was first cast into a coagulating bath containing 40% ammonium sulfate maintained at a temperature of about 40° C. From this bath the coagulated film was led into a regenerating bath containing 12% sulfuric acid and 18% sodium sulfate maintained at a temperature of about 45° C. The film was then purified, softened, and dried in the conventional manner.

The following table summarizes the important properties of the resulting films.

TABLE 3

| Viscose Temperature (° C.) | Tear Strength (grams) | Impact Strength (kg.-Cm.) | Tenacity (Kg.) | Elongation (Percent) |
| --- | --- | --- | --- | --- |
| 25 | 7.9 | 5.1 | 14.6 | 21 |
| 30 | 8.6 | 5.4 | 16.1 | 21 |
| 35 | 8.8 | 6.0 | 18.2 | 21 |
| 40 | 9.4 | 6.4 | 20.7 | 21 |
| 45 | 8.9 | 4.7 | 22.5 | 21 |
| 50 | 8.7 | 4.5 | 20.5 | 21 |

Figure 3:
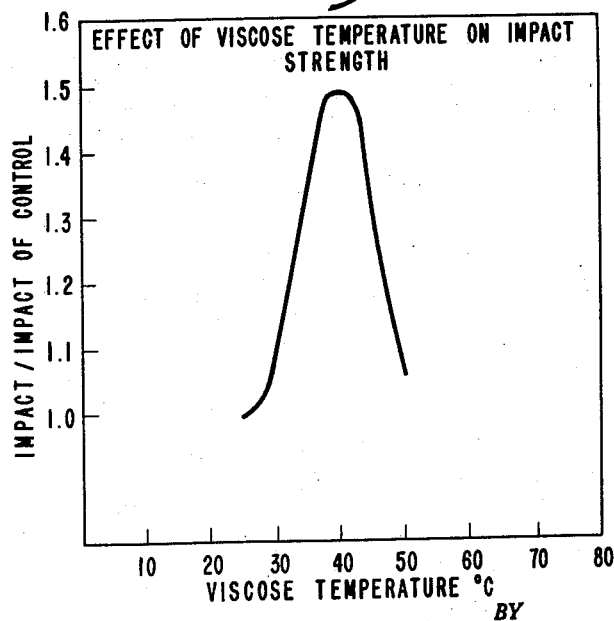

Figure 3 illustrates the criticality of the casting temperature in this coagulating and regenerating system in improving impact strength. The temperature is plotted versus the ratios of impact strength/impact strength of a control at 25° C. The figure shows that an improvement of from 30% to 50% in impact strength may be achieved by casting the viscose at a temperature between about 38° C. and about 45° C.

*Example III*

A viscose solution containing a relatively large amount of cellulose, 11.26% cellulose, and 6.5% total alkali was prepared using 26 parts of carbon disulfide to 100 parts of cellulose. The solution had a viscosity of 228 poises. Prior to extrusion the viscose solution was heated to a temperature of 42° C. by passing it through the heat-exchanger previously described to reduce its viscosity to about 100 poises. The heated viscose solution was cast into a coagulating and regenerating bath containing 14.6% sulfuric acid and 17% sodium sulfate maintained at 43° C. The tension on the film was controlled so that the amount of stretch prior to regeneration did not exceed 25%. The regenerated cellulose film was then passed through the conventional purification and softening treatments and then dried. The resulting film showed a substantial improvement in strength, durability and gauge variation across its width when compared to a control cast at 20° C.

The following theory is presented to account for the unexpected success of this process. However, the proposed theory should not be construed as limitative of the invention in any way. It is believed that during extrusion of viscose solution between the lips of the hopper the viscose is subjected to high shearing forces. These forces disrupt the structure of the randomly dispersed cellulose particles tending to uncoil the kinked chains aligning or orienting the chains in the direction of flow. This so called "shear-induced orientation" persists long enough to be permanently set in the ultimate regenerated cellulose sheet. Such orientation induces differences in physical properties in the longitudinal and transverse directions of the sheet. These differences account for the comparatively poor impact and tear strengths of the material. Heating the viscose solution prior to extrusion provides an increased rate of coagulation and greater mobility to the individual chains. The increased mobility opposes the shear forces which cause alignment or orientation. The increased mobility due to heating and the lower orientation due to low stretch combine to provide the outstanding results of this invention. Furthermore, it is theorized that any orientation induced by shear is dissipated more rapidly in a heated viscose solution.

The two important aspects of the invention:

(1) Casting viscose heated to a temperature between 38° C. and 50° C.

(2) Stretching the cast coagulated film not more than 25% prior to complete regeneration can be accomplished without much difficulty. Heating may be accomplished by passing the viscose through a helical coil immersed in a vessel containing aqueous liquid at a temperature of 60° C. to 100° C. as described. It is also possible to use the coagulating and regenerating bath or one of the treating baths which contains hot liquid as the source of heat. Instead of a heating bath, electric heating coils or high frequency electrostatic heating devices may be applied to the viscose lines. Control of stretching is achieved by controlling the speeds of the various rolls which drive the film through the continuous coagulating, regeneration, purification and drying system. In adjusting the speeds of the rolls to prevent stretch above 25% prior to completing regeneration of the cellulose film, due regard must be given to normal film shrinkage which occurs in the process. Wind-up speeds of 20 yards per minute or as high as 200 yards per minute may be used successfully in this process.

The process of this invention provides a regenerated cellulose film of high impact strength, high tear strength, high tenacity, and uniform gauge across its width. Such a film is useful as a packaging material, particularly when the package may be subjected to harsh treatment. The film may also be used in any application where regenerated cellulose film has heretofore been used.

It should be understood that changes may be made in the process without departing from the spirit and scope

What is claimed is:

1. A process for producing regenerated cellulose film of improved tear and impact strengths which comprises casting a viscose solution at a temperature of 38° C. to 50° C. into a coagulating and regenerating bath maintained at a temperature of 40° C. to 55° C.; stretching the partially regenerated film prior to completing regeneration, said stretching being less than 25%; washing the film after completing regeneration; and drying the film.

2. A process as in claim 1 wherein the temperature of the coagulating and regenerating bath is maintained within 5° C. of the temperature of the viscose solution.

3. A process for producing regenerated cellulose film having an improved impact and tear strength which comprises the steps of xanthating alkali cellulose with 25 parts to 50 parts of carbon disulfide, by weight, to 100 parts of cellulose, to produce a viscose solution containing 8% to 20% cellulose and 4% to 15% total alkali; heating the viscose solution to 38° C. to 50° C.; casting the heated viscose solution into an aqueous sulfuric acid-sodium sulfate bath maintained at a temperature of from 40° C. to 55° C.; stretching the partially regenerated film prior to completing regeneration, said stretching being less than 25%; washing the film after completing regeneration; and drying the film.

4. A process in accordance with claim 3 wherein the temperature of the bath is maintained within 5° C. of the viscose solution.

References Cited in the file of this patent

UNITED STATES PATENTS

| | | |
|---|---|---|
| 1,910,502 | Schmidt et al. | May 23, 1933 |
| 2,338,182 | Hutchinson | Jan. 4, 1944 |
| 2,445,333 | Nichols | July 20, 1948 |
| 2,611,928 | Merion et al. | Sept. 30, 1952 |
| 2,698,967 | Reichel et al. | Jan. 11, 1955 |